(12) United States Patent
Giles et al.

(10) Patent No.: US 6,238,787 B1
(45) Date of Patent: May 29, 2001

(54) METHOD OF ATTACHING A STRIP TO A RUBBER MOLDED PART

(75) Inventors: Sanford F. Giles, Chicago; Alex T. Koshy, Morton Grove; Edward John Busch, Downers Grove, all of IL (US)

(73) Assignee: Park-Ohio Industries, Cleveland, OH (US)

( * ) Notice: Subject to any disclaimer, the term of this patent is extended or adjusted under 35 U.S.C. 154(b) by 0 days.

(21) Appl. No.: 08/941,950

(22) Filed: Oct. 1, 1997

(51) Int. Cl.$^7$ ........................................ B32B 15/04
(52) U.S. Cl. .......................... 428/343; 428/346; 428/352; 156/273.9; 156/275.7; 156/329; 156/332
(58) Field of Search .............................. 156/273.9, 275.7, 156/329, 332; 428/343, 346, 352

(56) References Cited

U.S. PATENT DOCUMENTS

| | | | |
|---|---|---|---|
| 3,645,817 | * | 2/1972 | Walker et al. .................... 156/108 |
| 4,444,700 | * | 4/1984 | Fondren ............................ 264/438 |
| 4,569,879 | * | 2/1986 | Groves ............................. 428/198 |
| 4,661,299 | * | 4/1987 | Thorsrud ........................... 264/491 |
| 4,764,799 | * | 8/1988 | Malaviya .......................... 257/514 |
| 4,790,965 | * | 12/1988 | Thorsrud .......................... 264/491 |
| 4,840,758 | * | 6/1989 | Thorsrud .......................... 264/421 |
| 4,941,936 | * | 7/1990 | Wilkinson et al. ............... 156/274.8 |
| 4,969,968 | * | 11/1990 | Leatherman ...................... 156/272.4 |
| 5,182,134 | * | 1/1993 | Sato .................................. 427/543 |
| 5,283,119 | * | 2/1994 | Shuttleworth et al. ........... 428/375 |
| 5,304,409 | * | 4/1994 | Nozaki ............................. 428/122 |
| 5,827,392 | * | 10/1998 | Buckley et al. ................. 156/275.3 |
| 5,861,211 | * | 1/1999 | Thakkar et al. .................. 428/343 |
| 5,922,783 | * | 7/1999 | Wojciak ............................ 522/18 |

OTHER PUBLICATIONS

CRC Handbook of Chemistry and Physics, 80th Edition, p 10–212–10–213, 1999.*
Webster's Dictionary, 10th Edition, p 963, 1997.*

* cited by examiner

Primary Examiner—Elizabeth M. Cole
Assistant Examiner—Arti R. Singh
(74) Attorney, Agent, or Firm—Barnes & Thornburg

(57) ABSTRACT

A method of attaching to a rubber molded part a strip having an acrylic polymer adhesive on one side, including the step of applying radio frequency energy to the rubber molded part to generate heat therein and to cause the acrylic polymer adhesive to melt bond to the rubber molded part. The acrylic polymer is an acrylic-silane interpolymer of primarily acrylic ester monomer interacted with an organosilane, which interpolymer has a $T_g$ of –10° to 80° C. The rubber molded part includes radio frequency sensitive material to facilitate bonding to the acrylic polymer adhesive during application of the radio frequency energy thereto. Desirably, the strip also includes a pressure sensitive adhesive on its other side for securing the rubber part to a component of an automobile or other vehicle by applying pressure to the rubber part. The strip may include an acrylic foam core between the acrylic polymer adhesive and the pressure sensitive adhesive.

30 Claims, 3 Drawing Sheets

METHOD OF ATTACHING A STRIP TO A RUBBER MOLDED PART

BACKGROUND

Rubber molded parts or strips are often used to seal gaps and the like on automobiles, trucks and other vehicles and often also to enhance the aesthetics of such automobiles. For example, rubber molded strips are often applied around automobile door frames, window trunk frames and headlamps to provide a seal and prevent moisture, dirt and the like from passing inside the automobile or components of the automobile. Rubber molded parts may also be secured to the side panels or other components of the automobile for aesthetic, protective or other purposes.

It is important that such rubber molded parts be secured to the automobile in a manner such that the rubber molded parts remain secured to the automobile over a long period of time despite the wide range of weather conditions, such as, rain, snow or other moisture and the extreme cold and heat, usually encountered by automobiles during their useful lives. One heretofore known method of securing rubber molded parts to automobiles is by using two-sided tape. For example, it is known to use a tape, such as that sold by The Minnesota Mining and Manufacturing Company under the name Brand 5404, having an acrylic polymer adhesive on one side which can be bonded to the rubber molded strip by application of heat to the surface of the tape. The acrylic polymer adhesive is described in U.S. Pat. No. 4,569,879, which issued on Feb. 11, 1986 to Groves. The Brand 5404 tape has a pressure sensitive adhesive on its other side adapted to be secured to the automobile component upon application of pressure to the rubber molded part and the component. This method of securing rubber molded parts to an automobile has achieved limited success, however, because the rubber molded part often times separates from the tape, and thus, the automobile over time.

Accordingly, it is an object of the present invention to provide a method of attaching a strip, tape or the like to a rubber molded part that provides a durable attachment or bond between the strip and rubber molded part. It is further object to provide such a method for use in connection with securing the rubber part to an automobile or other vehicle.

SUMMARY

In accordance with these and other objects, the present invention provides a method of attaching to a rubber molded part comprising radio frequency sensitive material a strip having an acrylic polymer adhesive on a portion of the strip adjacent the rubber molded part. The method includes the steps of applying radio frequency energy to the rubber molded part so that heat is generated within the rubber molded part causing the acrylic polymer adhesive to bond to the rubber molded part. The acrylic polymer adhesive desirably is an acrylic-silane interpolymer of primarily acrylic ester monomer interacted with an organosilane, which interpolymer has a $T_g$ (glass transition temperature) of about $-10°$ to about $80°$ C.

Desirably, the strip also includes a pressure sensitive adhesive on another portion for securing the rubber molded part to a component of an automobile or other vehicle, such as, for example, a headlamp, by applying pressure to the rubber molded part and the component to cause the pressure sensitive adhesive to bond to the component. The strip may have any suitable shape or configuration, depending upon the shape, configuration or intended function of the rubber molded part or the component of the automobile. In a preferred embodiment, the strip is elongated and is desirably in the form of a tape that includes an acrylic foam core between the acrylic polymer adhesive and the pressure sensitive adhesive. In accordance with a preferred embodiment of the invention, the strip is the Brand-5404 tape sold by the Minnesota Mining and Manufacturing Company that includes the acrylic polymer adhesive described in U.S. Pat. No. 4,568,879, which is incorporated herein in its entirety by reference.

Application of radio frequency energy utilizes the dielectric properties of the rubber molded part to generate heat therein. In a preferred embodiment, the rubber molded part comprises vulcanized rubber, and includes a composition particularly well suited for facilitating the strong and durable bond. When the radio frequency energy is applied, the alternating electric field of the radiation causes an oscillatory displacement of the polar components of the rubber molded part, thereby resulting in a rise in the temperature of the rubber molded part. The temperature rise of the rubber molded part causes a temperature rise in the acrylic polymer adhesive, causing the acrylic polymer adhesive to melt bond to the rubber molded part. The amount of heat generated in the rubber molded part is based on the formula:

$$P = K \in \tan \delta$$

where

P=heat generated;

K=constant dependent upon the frequency of the applied radiation, the electric field strength, the material dimensions, and the units used;

$\in$=dielectric constant of the material; and $\tan \delta$=loss tangent or dissipation factor of the material.

The rubber part also may have any suitable shape or configuration, depending upon the shape, configuration or intended function of the rubber molded part or the component of the automobile.

Application of radio frequency energy to the tape and rubber molded part in accordance with a preferred embodiment of the invention results in a bond between the tape and the rubber molded part that can withstand a wide range of weather conditions over a long period of time. Surprisingly, the bond is stronger, more durable and more uniform than the bond resulting from applying heat in a conventional manner to the acrylic polymer adhesive. Accordingly, the present invention is particularly well suited for use in connection with securing rubber molded parts to automobiles and other vehicles for sealing and aesthetic purposes.

BRIEF DESCRIPTION OF DRAWINGS

The present invention and the advantages thereof will become more apparent upon consideration of the following detailed description when taken in conjunction with the accompanying drawings of which.

DETAILED DESCRIPTION OF THE PREFERRED EMBODIMENTS

Figure 1:
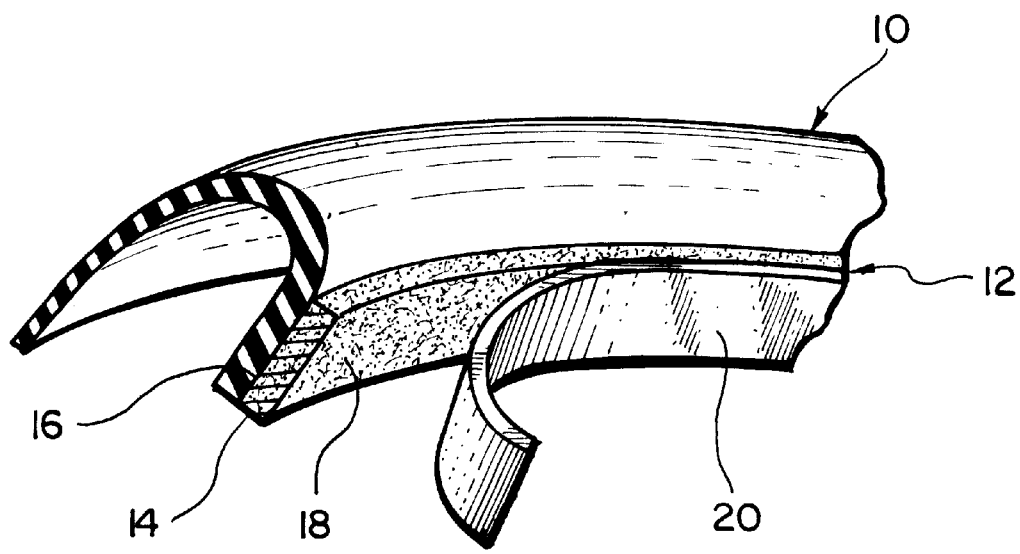
FIG. 1 is a partial fragmentary view, in cross section, of a rubber molded part and an elongated strip or tape attached to the rubber molded part in accordance with an embodiment of the invention.
Figure 2:
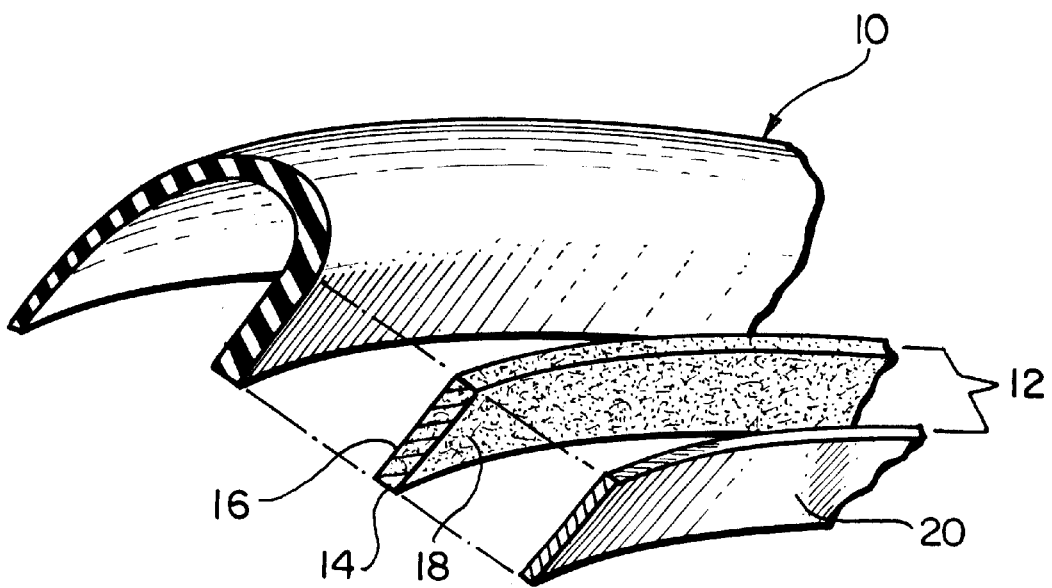
FIG. 2 is an exploded view of the rubber molded part and elongated strip of FIG. 1.

FIGS. 1–2 illustrate a rubber molded part in the form of a rubber molded part 10 and a strip in the form of a tape 12 for securing the rubber part 10 to a component of an automobile or other vehicle. The tape 12 desirably includes a foam core 14, and has two substantially flat sides 16 and 18, one of which is adapted to be attached to the rubber part 10 and the other of which is adapted to be attached to a component of the automobile or other vehicle. The illustrated rubber part 10 is configured for attachment to a headlamp of an automobile, and has a generally U-shaped cross section. The rubber part 10, however, may have any other suitable shape or configuration, depending on the shape or configuration of the component of the automobile or structure to which it is to be secured on its intended function. Similarly, the illustrated strip is elongated and in the form of the tape 12, but it may have any other shape or configuration depending on the shape or configuration of the rubber part 10, the component of the automobile or structure to which it is to be secured, and the intended function.

The tape 12 has an adhesive on the one side 16 adapted to be attached to the rubber part 10 by application of radio frequency energy. Desirably, the adhesive is an acrylic polymer as disclosed in U.S. Pat. No. 4,569,879, which is incorporated herein in its entirety by reference. The acrylic polymer preferably is of primarily at least one alkyl acrylate and/or methacrylate ester monomer (hereafter called "acrylic ester monomer") such as ethyl acrylate. The acrylic ester monomer may be copolymerized with at least one copolymerizable monomer having a polar group such as acrylic acid, methacrylic acid, itaconic acid, maleic acid or anhydride, the amides of said acids, acrylonitrile, methacrylonitrile, and N-vinyl-2-pyrrolidone. The copolymerizable polar monomer may comprise up to about 50 mol percent of the total monomers. Other copolymerizable monomers may also be employed in various amounts without detracting from the value of the acrylic polymer for the purposes of the invention. Among such copolymerizable monomers are styrene, vinyl acetate and vinyl chloride, which when used are preferably used in amounts up to about 5 mol percent of the total monomers.

The acrylic polymer desirably has a $T_g$ (glass transition temperature) or a weight-averaged $T_g$ of about −10° to about 80° C., and has an interacted functionally reactive organosilane coupling agent in an amount of at least 0.2 part per 100 parts by weight of total monomer. The organosilane may be interpolymerized with the acrylic ester monomer, with or without other copolymerizable monomers, or it may be reacted with functional groups on the backbone of an acrylic polymer. Either process results in what is hereinafter called an "acrylicsilane interpolymer".

The organosilane desirably has the general formula $R_{(4-n)}SiX_n$, where X is a hydrolyzable group such as ethoxy, methoxy, or 2-methoxy-ethoxy; R is a monovalent organic radical of from 1 to 12 carbon atoms which contains a functional organic group such as mercapto, epoxy, acrylyl, methacrylyl, or amino; and n is an integer of from 1 to 3.

The organosilane can cause solutions of polymers to gel, so that it may be desirable to employ an alcohol or other known stabilizers. When the organosilane is to be copolymerized with the other monomer, a stabilizer should be selected that does not interfere with the polymerization. Methanol is especially useful and is preferably employed in amounts from about twice to about four times the amount of the organosilane.

Acrylic ester monomers especially useful for making the acrylic-silane interpolymer are those which homopolymerize to a $T_g$ of at least −10° C., including methyl acrylate, methyl methacrylate, ethyl methacrylate, propyl methacrylates, butyl methacrylates, bomyl acrylates, bomyl methacrylates, 2-phenoxyethyl acrylate, 2-phenoxyethyl methacrylate, the mono- and di-methyl and ethyl esters of itaconic acid, and the mono- and di-methyl and ethyl esters of maleic acid. Useful acrylic ester monomers which provide reduced $T_g$ include ethyl, butyl and octyl acrylates, and n-amyl, hexyl and octyl methacrylates.

Figure 3:
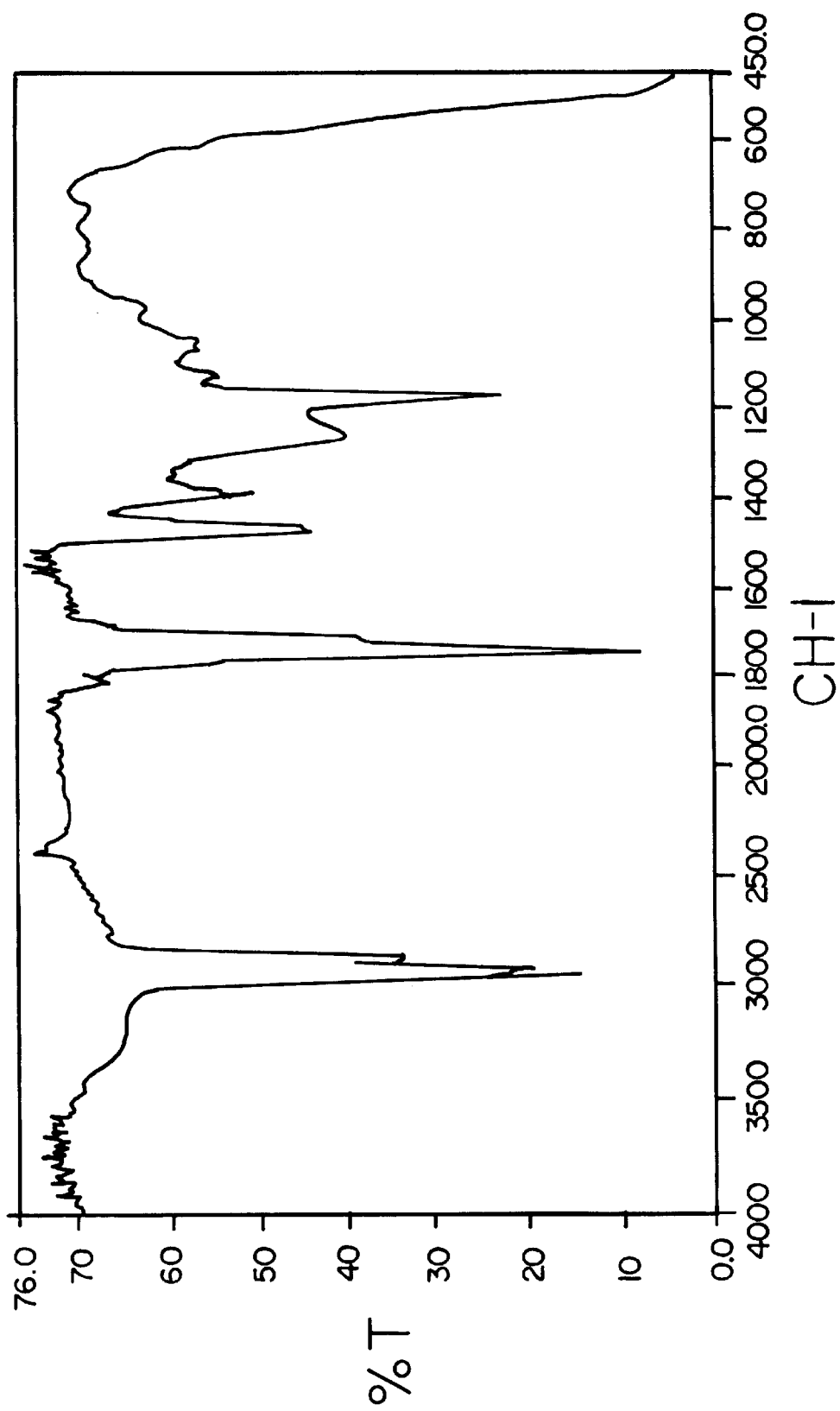
FIG. 3 is an infrared spectra of a preferred embodiment of the acrylic polymer adhesive of the tape of FIGS. 1–2.

The acrylic polymer adhesive in accordance with the present invention desirably has an infrared spectra illustrated in FIG. 3 or that substantially corresponds to the infrared spectra illustrated in FIG. 3. The Y-axis in FIG. 3 represents the percentage transmittance, and the X-axis represents the wave number measured in units of cm$^{-1}$.

The tape 12 includes any suitable adhesive on the other side 18 for attaching to the automobile component. In a preferred embodiment, for example, the adhesive on the other side 18 is a pressure sensitive adhesive. The pressure sensitive adhesive desirably is an acrylic adhesive, such as the AR5 acrylic or the AR7 acrylic commercially available from the Minnesota Mining and Manufacturing Company. The tape 12 desirably may also include a release liner 20, such as a polyethylene or the like, removably disposed on the pressure sensitive adhesive. Desirably, the foam core 14 of the tape 12 is an acrylic foam.

The tape 12 has a tape thickness that, excluding the release liner 20, desirably is about 1.19 mm or is otherwise within a range of about 1.04 mm to about 1.34 mm. The density of the tape 12, excluding the release liner 20, desirably is about 690 kg/m$^3$ or is otherwise within a range of about 610 kg/m$^3$ to 770 kg/m$^3$.

Any suitable tape that desirably has the properties described above may be used. In a preferred embodiment, for example, the tape 12 is the tape presently sold by the Minnesota Mining and Manufacturing Company under the designation "Brand 5404".

The rubber part 10 is a vulcanizate having any suitable composition that includes radio frequency energy sensitive materials to facilitate bonding with the acrylic polymer adhesive. The radio frequency sensitive materials preferably include a polar carbon black filler and desirably a combination of polar carbon black fillers of different grades. The composition of the rubber part 10 includes other suitable materials such as various EPDM materials, processing materials, processing aids and vulcanizing materials, and is a vulcanized ethylene-propylene-diene-monomer ("EPDM") compound. In accordance with a preferred embodiment, the EPDM compound has the following formulation:

| INGREDIENT | % of Composition (by weight) |
| --- | --- |
| DUTRAL 4044 (Polymer) | 16.800 |
| DUTRAL 4033 (Polymer) | 16.800 |
| TRILENE 65 (Polymer) | 6.300 |
| VESTEMAMER 8012 (Polymer) | 4.201 |
| N330 (filler) | 8.403 |
| N550 (filler) | 33.610 |
| INDOPOL H-330 (processing material) | 6.300 |
| STRUKTOL WB212 (processing material) | 2.100 |
| AC 617 (processing material) | 0.840 |
| STEARIC ACID (Processing aid) | 0.420 |

-continued

| INGREDIENT | % of Composition (by weight) |
|---|---|
| ZINC OXIDE (Processing aid) | 2.100 |
| MORFAX (vulcanizing material) | 1.260 |
| SULPHUR (vulcanizing material) | 0.840 |

Dutral 4044 and Dutral 4033 are commercially available EPDMs supplied or produced by Enichem. Trilene 65 is a commercially available liquid EPDM supplied or produced by Uniroyal Chemicals, Inc. Vestemamer 8012 is a commercially available polyoctomonomer supplied or produced by Struktol, Inc. N330 and N550 are commercially available carbon blacks supplied or produced by Engineered Carbons, Inc. Indopol H-330 is a commercially available processing liquid polybutadiene supplied or produced by Amoco. Struktol WB212 is a commercially available fatty acid supplied or produced by Struktol, Inc. AC 617 is a commercially available polyethylene processing acid supplied or produced by Allied-Signal. Morfax is a commercially available vulcanizing material supplied or produced by R. T. Vanderbilt, Inc. The above formulation preferably is vulcanized at 350° F. or otherwise within the range of about 345° F. to about 355° F.

The acrylic polymer adhesive on the one side 16 of the tape 12 is bonded to the rubber part 10 by application in any suitable manner of radio frequency energy. Generally, the tape 12 and rubber part 10 may be disposed within a tooling device as a composite, such that the side 16 of the tape 12 is adjacent the rubber part 10 and the acrylic polymer adhesive is in contact with the rubber part. The tooling device is held by a press, and a radio frequency energy generator produces high frequency energy and directs the energy to the press and tooling. The frequency of radio frequency energy is desirably applied at a frequency of about 27.12 MHz± 160 KHz. The radio frequency energy generates heat within the rubber part 10, causing temperature rises in the rubber part 10 and the acrylic polymer adhesive and causing the acrylic polymer adhesive to melt bond to the rubber part 10. The tape 12 and rubber part 10 composite are then removed from the tool and press.

Figure 4:
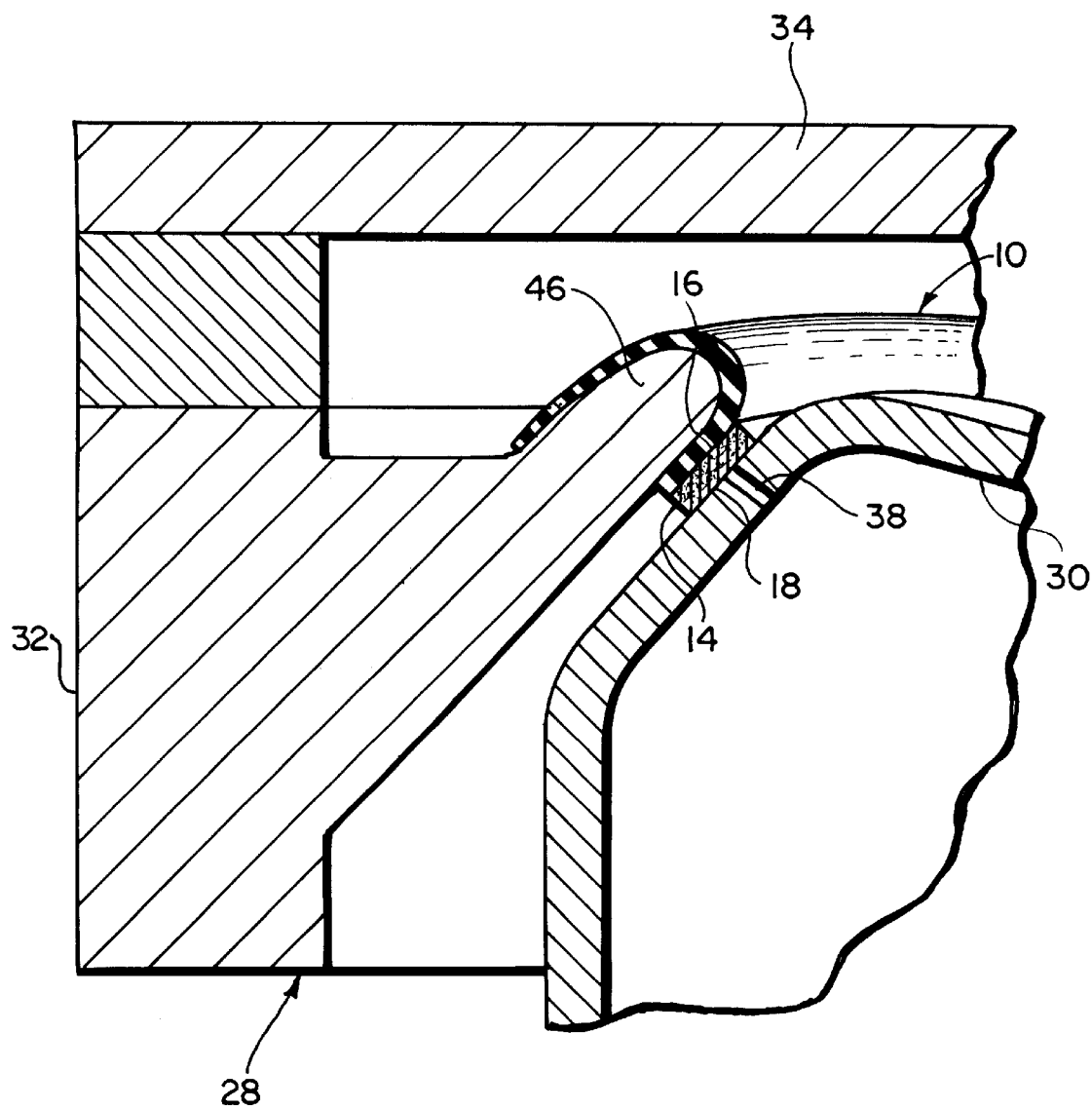
FIG. 4 is a partial fragmentary view, in cross section, of an example of a radio frequency sealing fixture for bonding an elongated strip to a rubber molded part in accordance with an embodiment of the invention.

FIG. 4 provides an example, schematic in nature, of a radio frequency welding fixture 28 that can be used for attaching the tape 12 to the rubber part 10, which is intended to then be secured to the headlamp of an automobile. The illustrated welding fixture 28 comprises a lower vacuum electrode 30, an upper electrode 32, a fixture lid 34, and a fixture plate (not shown). The vacuum electrode 30 includes a plurality of vacuum holes 38 defined around a top rim of the vacuum electrode and is attached to a vacuum hose (not shown).

Initially, the fixture lid 34 is in an open position and the upper electrode 32 is raised relative to the lower electrode 30. After the vacuum is activated, the tape 12 is loaded on the vacuum electrode 30 with the other side 18 of the tape 12 facing the vacuum holes 38. The tape 12 may, if desired, be cut in half and define recesses for engaging complementary notches on the lower electrode 30 to facilitate nesting and engagement with the lower electrode. The upper electrode 32 is lowered an initial increment, and the rubber part 10 is then engaged with a ringed contour 46 of the upper electrode. The upper electrode 32 is then lowered to the lower electrode 30, and the fixture lid 34 is lowered to a closed position.

Thereafter, the fixture 28 is coupled with a radio frequency generator (not shown) in any suitable manner, such as, for example, by a shuttle system or the like. The radio frequency generator is energized to apply radio frequency energy to the composite comprising the rubber part 10 and adjacent tape 12, thereby generating heat within the rubber part 10. If desired, the radio frequency energy can be applied in several steps, and the fixture 28 can be moved to different positions during the process. After the bonding has occurred, the fixture 28 is then disengaged from the radio frequency generator and the rubber part 10 and tape 12 composite can be removed.

Any suitable radio frequency generator may be utilized and the radio frequency energy may be applied at any suitable frequency and for any suitable duration. In the above headlamp application, for example, a 12.5 KW, 27.12 MHz radio frequency generator manufactured by the Callanan Company of Elk Grove, Ill. may be utilized. With this application, desirably, the generator is operated at about 30% power.

Once the acrylic polymer adhesive is bonded to the rubber part 10, the rubber part can be secured to the automobile component or the like by removing the release layer 20 and affixing the other side 18 of the tape 12 to the desired component of the automobile, such as, depending on the configuration of the rubber part, a frame of a door, window or trunk, a headlamp, or an exterior panel of the automobile, by application of pressure. In the illustrated embodiment wherein the rubber part 10 has a generally U-shaped cross section, the height of the sides of the rubber part vary along the length or perimeter of the rubber part to facilitate attachment to the headlamp.

Application of radio frequency energy to the tape 12 and adjacent rubber part 10 composite in accordance with a preferred embodiment of the invention results in a strong, durable and uniform bond. Once the rubber part 10 is secured to the automobile or the like, the rubber part 10 will remain secured to the automobile even after withstanding a wide range of weather conditions over a long period of time.

The foregoing description is for purposes of illustration only and is not intended to limit the scope of protection accorded this invention. The scope of protection is to be measured by the following claims, which should be interpreted as broadly as the inventive contribution permits.

The claimed invention is:

1. A method of attaching, to rubber molded part comprising radio frequency sensitive material including a polar carbon black filler, a strip having an acrylic polymer adhesive on a portion of the strip adjacent the rubber molded part, the method including the step of applying radio frequency energy in the range of about 27.12 MHZ to the rubber molded part to generate heat within the rubber molded part and cause the acrylic polymer adhesive to bond in a generally uniform manner to the rubber molded part.

2. The method of claim 1 wherein the acrylic polymer adhesive comprises an acrylic-silane interpolymer of primarily acrylic ester monomer interacted with organosilane in an amount of at least 0.2 part per 100 parts by weight of total monomer, which interpolymer has a $T_g$ of −10° to 80° C.

3. The method of claim 2 wherein said acrylic ester monomer is selected from alkyl acrylates and methacrylates having 1–8 carbon atoms in their alkyl groups; bornyl acrylates and methacrylates; 2-phenoxyethyl acrylate and methacrylate; the mono- and di- methyl and ethyl esters of itaconic acid and the mono- and di- ethyl esters of maleic acid.

4. The method of claim 2 wherein said acrylic-silane interpolymer is a polymer of monomers, up to 50 mol % of which is at least one copolymerizable monomer selected from acrylic acid, methacrylic acid, itaconic acid, maleic acid, maleic anhydride, amides of said acids, acrylonitrile, methacrylonitrile, and N-vinyl-2-pyrrolidone.

5. The method of claim 4 wherein styrene, vinyl acetate and vinyl chloride comprise up to 5 mol % of the total monomers.

6. The method of claim 2 wherein the amount of organosilane is from 0.5 to 4 parts per 100 parts by weight of total monomer.

7. The method of claim 1 wherein the acrylic polymer adhesive has an infrared spectra that substantially corresponds to the infrared spectra of FIG. 3.

8. The method of claim 1 wherein the radio frequency sensitive material includes a plurality of polar carbon black fillers of different grades.

9. The method of claim 8 wherein the rubber molded part comprises EPDM's, a polyoctomoner, a carbon black, liquid polybutadiene, a fatty acid, a polyethylene processing acid, a vulcanizing material, and a sulphur.

10. The method of claim 1 wherein the strip has an adhesive on the other side, the method further including the step of securing the rubber molded part to a component of a motor vehicle by applying pressure to the rubber molded part.

11. A method of securing to a component of a motor vehicle a rubber molded part comprising radio frequency sensitive material including a polar carbon black filler, the method including the steps of:
(a) applying radio frequency energy in the range of about 27.12 MHZ to a composite comprising the rubber molded part and a strip adjacent the rubber molded part, the strip having an acrylic polymer adhesive on a side of the strip adjacent the rubber molded part and a pressure sensitive adhesive on an other side of the strip, to generate heat within the composite and to cause the acrylic polymer adhesive to bond in a generally uniform manner to the rubber molded part; and
(b) applying pressure to the rubber molded part to cause the pressure sensitive adhesive to bond to the component of the motor vehicle.

12. The method of claim 11 wherein the adhesive on said one side of the strip comprises an acrylic-silane interpolymer of primarily acrylic ester monomer interacted with organosilane in an amount of at least 0.2 part per 100 parts by weight of total monomer, which interpolymer has a $T_g$ of $-10°$ to $80°$ C.

13. The method of claim 12 wherein said acrylic ester monomer is selected from alkyl acrylates and methacrylates having 1–8 carbon atoms in their alkyl groups; bornyl acrylates and methacrylates; 2-phenoxyethyl acrylate and methacrylate; the mono- and di- methyl and ethyl esters of itaconic acid and the mono- and di- ethyl esters of maleic acid.

14. The method of claim 12 wherein said acrylic-silane interpolymer is a polymer of monomers, up to 50 mol % of which is at least one copolymerizable monomer selected from acrylic acid, methacrylic acid, itaconic acid, maleic acid, maleic anhydride, amides of said acids, acrylonitrile, methacrylonitrile, and N-vinyl-2-pyrrolidone.

15. The method of claim 14 wherein styrene, vinyl acetate and vinyl chloride comprise up to 5 mol % of the total monomers.

16. The method of claim 11 wherein the amount of organosilane is from 0.5 to 4 parts per 100 parts by weight of total monomer.

17. The method of claim 11 wherein the acrylic polymer has an infrared spectra that substantially corresponds to the infrared spectra of FIG. 3.

18. The method claim 11 wherein the radio frequency sensitive material includes a plurality of polar carbon black fillers of different grades.

19. The method of claim 18 wherein the rubber molded part consists essentially of approximately 16.800% by weight of am EPDM, approximately 16.800% by weight of another EPDM, approximately 6.300% by weight of a liquid EPDM approximately 4.201% by weight of polyoctomoner, approximately 8.403% by weight of a carbon black, approximately 33.68% by weight of another carbon black, approximately 6.300% by weight of a processing liquid polybutadiene, approximately 2.100% by weight of a fatty acid, approximately 0.840% by weight of a polyethylene processing acid, approximately 0.420% by weight of stearic acid, approximately 2.100% by weight of zinc oxide, approximately 1.260% by weight of a vulcanizing material and approximately 0.840% by weight of sulphur.

20. The method of claim 11 wherein the rubber molded part comprises EPDM's, a polyoctomoner, a carbon black, liquid polybutadiene, a fatty acid, a polyethylene processing acid, a vulcanizing material, and a sulphur.

21. A method of attaching, to rubber molded part comprising an eythylene-propylene-diene-monomer and radio frequency sensitive material, a strip having an acrylic polymer adhesive on a portion of the strip adjacent the rubber molded part, the method including the step of applying radio frequency energy in the range of about 27.12 MHZ to the rubber molded part to generate heat within the rubber molded part and cause the acrylic polymer adhesive to bond in a generally uniform manner to the rubber molded part.

22. The method of claim 21 wherein the acrylic polymer adhesive comprises an acrylic-silane interpolymer of primarily acrylic ester monomer interacted with organosilane in an amount of at least 0.2 part per 100 parts of weight of total monomer, which interpolymer has a $T_g$ of $-10°$ to $80°$ C.

23. The method of claim 21 wherein the acrylic polymer adhesive has an infrared spectra that substantially corresponds to the infrared spectra of FIG. 3.

24. The method claim 21 wherein the radio frequency sensitive material includes a polar carbon black filler.

25. The method claim 21 wherein the radio frequency sensitive material includes a plurality of polar carbon black fillers of different grades.

26. The method of claim 21 wherein the strip has an adhesive on the other side for securing the rubber molded part to a component of a motor vehicle.

27. A method of securing to a component of a motor vehicle a rubber molded part comprising an ethylene-propylene-diene-monomer and radio frequency sensitive material, the method including the steps of:
(a) applying radio frequency energy in the range of about 27.12 MHZ to a composite comprising the rubber molded part and a strip adjacent the rubber molded part, the strip having an acrylic polymer adhesive on a side of the strip adjacent the rubber molded part and a pressure sensitive adhesive on an other side of the strip, to generate heat within the composite and to cause the acrylic polymer adhesive to bond in a generally uniform manner to the rubber molded part; and
(b) applying pressure to the rubber molded part to cause the pressure sensitive adhesive to bond to the component of the motor vehicle.

28. The method of claim 27 wherein the adhesive on said one side of the strip comprises an acrylic-silane interpolymer of primarily acrylic ester monomer interacted with organosilane in an amount of at least 0.2 part per 100 parts by weight of total monomer, which interpolymer has $T_g$ of $-10°$ to $80°$ C.

29. The method of claim 27 wherein the radio frequency sensitive material includes a polar carbon black filler.

30. The method claim 27 wherein the radio frequency sensitive material includes a plurality of polar carbon black fillers of different grades.

* * * * *